(12) United States Patent
Hamm

(10) Patent No.: US 7,661,768 B2
(45) Date of Patent: Feb. 16, 2010

(54) INTEGRAL BRAKE SYSTEM HAVING ANTILOCK BRAKING FOR A MOTORCYCLE

(75) Inventor: Markus Hamm, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 428 days.

(21) Appl. No.: 11/505,822

(22) Filed: Aug. 18, 2006

(65) Prior Publication Data

US 2007/0040446 A1 Feb. 22, 2007

(30) Foreign Application Priority Data

Aug. 20, 2005 (DE) .................. 10 2005 039 396

(51) Int. Cl.
*B60T 8/32* (2006.01)
(52) U.S. Cl. .............. 303/9.64; 303/137; 303/176
(58) Field of Classification Search ............. 303/9.64, 303/137, 176
See application file for complete search history.

(56) References Cited

U.S. PATENT DOCUMENTS

| | | | | |
|---|---|---|---|---|
| 3,740,103 A | * | 6/1973 | Sweet et al. ............ | 303/186 |
| 4,494,801 A | * | 1/1985 | Ohmori et al. .......... | 303/186 |
| 5,199,770 A | * | 4/1993 | Yoshino et al. ......... | 303/137 |
| 5,253,931 A | * | 10/1993 | Koster et al. .......... | 303/176 |
| 5,322,355 A | * | 6/1994 | Jonner ................... | 303/186 |
| 5,416,708 A | * | 5/1995 | Matsuto et al. ........ | 303/137 |
| 5,816,668 A | * | 10/1998 | Heubner ............... | 303/116.2 |
| 2002/0175562 A1 | * | 11/2002 | Gale et al. ............ | 303/113.1 |

FOREIGN PATENT DOCUMENTS

| | | |
|---|---|---|
| DE | 38 03 563 A1 | 8/1989 |
| DE | 43 30 121 A1 | 3/1995 |
| DE | 102 05 229 A1 | 8/2003 |
| JP | 2000-71963 A | 3/2000 |

OTHER PUBLICATIONS

German Search Report with English Translation of pertinent portion dated Oct. 28, 2005 (Nine (9) pages).
European Search Report dated Jul. 9, 2009 including partial English translation (Eight (8) pages).

* cited by examiner

*Primary Examiner*—Thomas J Williams
(74) *Attorney, Agent, or Firm*—Crowell & Moring LLP

(57) ABSTRACT

In an integral brake system having antilock braking and including at least one brake actuating element, one front wheel brake, and one rear wheel brake, the antilock braking may optionally be selectively deactivated for the front wheel brake.

2 Claims, 1 Drawing Sheet

INTEGRAL BRAKE SYSTEM HAVING ANTILOCK BRAKING FOR A MOTORCYCLE

This application claims the priority of German patent application 102005039396.9, filed Aug. 20, 2005, and is expressly incorporated in its entirety by reference herein.

BACKGROUND AND SUMMARY OF THE INVENTION

The present invention relates to an integral brake system having antilock braking for a motorcycle.

For motorcycles, the term "integral brake system" is understood to mean a brake system in which the front wheel brake and the rear wheel brake of a motorcycle may be simultaneously triggered by actuating a brake lever, in particular a hand brake lever, optionally also a foot brake lever. In this manner, both wheel brakes may be triggered by actuating a single actuating element.

For integral brake systems it is known to reduce the brake pressure at the respective brake by use of an antilock braking system (ABS) when the tendency to lock appears at the front and/or rear wheel.

In particular for off-road and/or sport motorcycles having an antilock braking system, it is also known to provide a control option by which the antilock braking may be switched off. Such a control option is also known for motorcycles having an integral brake system. The switching off may be initiated, for example, by the driver by actuating a button. This control option is particularly suited for off-road and/or racetrack operation, since in such an operation the locking of at least one wheel may be desired. The intervention of an antilock braking system into such an operation may even be hazardous.

The described prior art has the disadvantage that, for motorcycles having integral braking as well as antilock braking that can be switched off, undesired locking of the rear wheel may occur in various driving situations when the antilock braking is in the switched-off state. Driving situations may also arise in which the rear wheel is not completely locked, but for which a tendency for the rear wheel to lock results in unstable driving conditions. The reason for undesired locking of the rear wheel in motorcycles with integral braking and with or without deactivated antilock braking of the rear wheel brake is generally that, in addition to the brake force distribution in the integral brake system, in certain driving situations a brake torque occurs on the rear wheel. This additional brake torque may be caused, for example, by a shifting operation to a lower gear, or, for steep ascents, as the result of brake force distribution in the integral brake system when the latter is designed for operation on flat roadways. Such undesired locking, or tendency to lock, entails significant hazards, and not only for the driver of the motorcycle.

The object of the present invention is to provide a safer integral brake system, having antilock braking that can optionally be switched off, for a motorcycle.

This object is achieved according to the invention by an integral brake system having antilock braking for a motorcycle, including at least one brake actuating element, one front wheel brake, and one rear wheel brake, and in which the antilock braking may optionally be selectively deactivated for the front wheel brake.

Thus, the driver may optionally change the motorcycle to an operating state in which, although the antilock braking for the front wheel brake is deactivated, the front wheel can be made to lock if desired, but in which the antilock braking for the rear wheel brake is active, so that undesired locking of the rear wheel is avoidable. As a result of the invention, the hazards associated with such undesired locking of the rear wheel are avoided. The safety of the driver, and possibly other traffic participants or persons present in off-road areas or on a racetrack, is increased.

It is known from DE 4330121 A1 to provide an antilock braking system that may be selectively deactivated for only one wheel brake of a motorcycle. However, the selective deactivation of the antilock braking according to DE 4330121 A1 involves the rear wheel brake, unlike the present invention, and is used for a totally different purpose than in the present invention. The purpose of selective deactivation of the antilock braking according to DE 4330121 A1 is that the driver can make use of the physical effects of a locking rear wheel, while the risk of crash due to a locked front wheel as the result of the antilock braking system is avoided. The object of the present invention is not achieved in this manner. Of course, it is understood that a device according to the present invention may be broadened in scope by the selective ability to deactivate antilock braking for the rear wheel brake according to DE 4330121 A1. By a combination of such a selective ability to deactivate antilock braking for the rear wheel brake with the selective ability to deactivate antilock braking for the front wheel brake according to the present invention, antilock braking for the motorcycle is completely overridden.

Alternatively or additionally, the antilock braking for the motorcycle may preferably be selectively switched off completely, i.e., for both wheel brakes (front wheel and rear wheel brakes), in a direct manner, such as by actuating a switching element. The driving dynamic effects of completely switching off thus remain the choice of the driver.

The integral brake system according to the invention is preferably designed such that the selective deactivation of the antilock braking for the front wheel can be triggered, starting from a previous state in which antilock braking is active for both wheel brakes. Alternatively or additionally, the antilock braking for the front wheel may be selectively deactivated by selectively activating antilock braking for the rear wheel brake, starting from a previous state in which antilock braking is not active.

Preferably, the selective deactivation of the antilock braking for the front wheel brake can be triggered voluntarily by the driver. According to one preferred embodiment of the present invention, the selective deactivation can be initiated by actuating a switching element. Alternatively, other methods known from the prior art for recognizing instructions from the driver, or automatic deactivation dependent on an automatically performed recognition of the instantaneous driving situation, are conceivable. After the selective deactivation, it is preferable to return to the activated state by a renewed, i.e., different, actuation of the same switching element.

The switching element for initiating the selective deactivation according to the invention preferably is designed as a button, for example in the form or outer appearance of a button known from the prior art for complete deactivation of the antilock braking for the brakes of a motorcycle.

Optionally, in addition to the switching element for initiating the selective deactivation according to the invention, another, optionally similarly designed, switching element may be provided for complete deactivation.

Alternatively or in addition to a continuous switch-off capability, the antilock braking for at least one wheel brake, in particular the antilock braking for the rear wheel brake, may be designed so that the antilock braking may be temporarily overridden. In contrast to a continuous switching off, in this case "overriding of the antilock braking" is understood to mean a deactivation of the antilock braking which is maintained only as long as a compliance condition is met within a braking process.

According to one preferred embodiment of the present invention, one such compliance condition for overriding the antilock braking for a wheel brake is that the wheel brake is triggered by a second brake function, provided in addition to the integral brake function, in such a way that the brake pressure to be produced based on the second brake function is greater than the pressure that has already been introduced by the integral brake function.

In addition, temporary overriding of the antilock braking for at least one wheel brake may preferably be initiated by a certain type of actuation of the at least one brake actuating element for the motorcycle.

According to one preferred embodiment of the present invention, the motorcycle has at least two brake actuating elements. A first brake actuating element is used for triggering the integral brake function, and a second brake actuating element is used for triggering a second brake function which affects only the rear wheel brake. According to this preferred embodiment of the present invention, the antilock braking for the rear wheel brake may be temporarily overridden by powerful actuation of the second brake actuating element. If desired, the driver may thus cause the rear wheel to lock when the antilock braking for the rear wheel brake is not continuously switched off.

Other objects, advantages and novel features of the present invention will become apparent from the following detailed description of the invention when considered in conjunction with the accompanying drawings.

DETAILED DESCRIPTION

Figure 1:
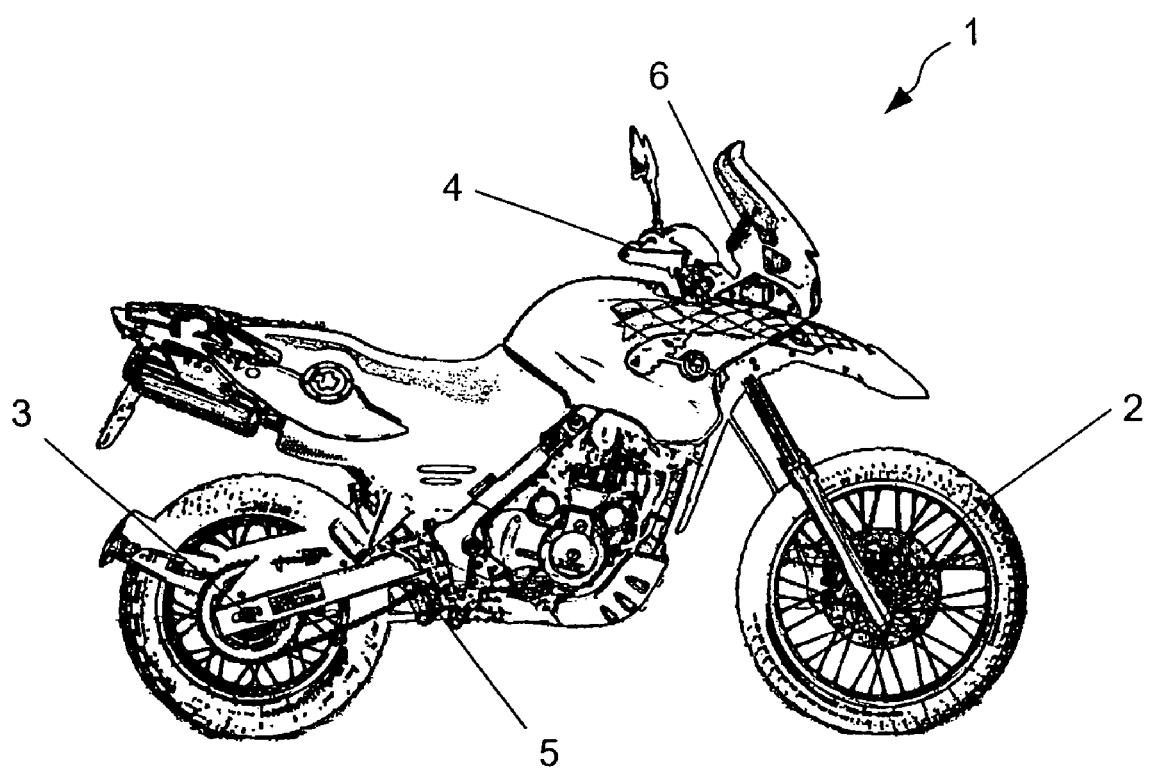
FIG. 1 schematically shows a motorcycle having an integral brake system according to one preferred embodiment of the invention.

The motorcycle 1 schematically illustrated in FIG. 1, having an integral brake system which includes a front wheel brake 2 and a rear wheel brake 3, has a hand brake lever 4 and a foot brake lever 5. The hand brake lever 4 is used for triggering both wheel brakes, i.e., the front wheel brake 2 and the rear wheel brake 3, by means of the integral brake function. The foot brake lever 5 is used to trigger only the rear wheel brake 3.

The integral brake function includes antilock braking for the front and rear wheels. The rear wheel brake 3 is triggered by actuating the foot brake lever 5, as follows: If the foot brake lever 5 is actuated so powerfully that the brake pressure to be correspondingly produced is greater than the pressure that has already been introduced at the rear wheel by the integral brake function, the antilock braking for the rear wheel is deactivated as long as this condition prevails.

In one initial state it is assumed that the antilock braking of the integral brake function is active for both the front and rear wheels.

The antilock braking may be deactivated only for the front wheel by actuating a button 6 provided in a control panel on the motorcycle. The antilock braking for the rear wheel remains continuously active, independent of actuation of the button 6, provided that said antilock braking is not overridden by a powerful actuation of the foot brake lever 5.

The initial state is abandoned by a one-time actuation of the button 6. The antilock braking for the front wheel is then deactivated, while the antilock braking for the rear wheel remains active.

If the driver actuates only the hand brake lever 4 in this state, i.e., for selectively deactivated antilock braking for the front wheel, thereby triggering the integral braking, the brake pressure at the rear wheel is reduced when wheel slip is detected by the antilock braking of the integral brake function. The brake pressure impinged on by the integral braking is thus reduced to zero, as needed, and locking of the rear wheel cannot occur.

On the other hand, if the driver actuates the foot brake lever 5 or both brake levers in this state, the brake pressure of the rear master brake cylinder is then also transmitted to the rear wheel brake 3 when the rear wheel locks or has the tendency to lock. The antilock braking for the rear wheel is overridden. Thus, if desired the driver can cause the rear wheel to lock, for example in an off-road setting.

As a result of the invention, locking of the rear wheel may also be prevented when antilock braking for the front wheel is switched off. Undesired locking of the rear wheel and the associated hazards are avoided. The invention thus contributes to safety in street traffic or in any other location the motorcycle is used.

As a result of the invention, the driver obtains all advantages of an integral brake system while retaining substantial freedom in handling.

The driver can continuously drive using front wheel and rear wheel antilock braking by not actuating the button 6 and only using the hand brake lever 4.

The driver can continuously deactivate the front wheel antilock braking and maintain the rear wheel antilock braking by actuating the button 6 and using only the hand brake lever 4.

The driver can maintain the front wheel antilock braking by not actuating the button 6, and can override the rear wheel antilock braking by using the foot brake lever 5.

The driver can continuously deactivate the front wheel antilock braking by actuating the button 6, and can override the rear wheel antilock braking by using the foot brake lever 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An integral brake system having antilock braking for a motorcycle, comprising:
   at least one brake actuating element;
   a front wheel brake; and
   a rear wheel brake,
   wherein
      the system is a motorcycle integral antilock braking system, and is configured to permit selective deactivation of the antilock braking for the front wheel brake while antilock braking for the rear wheel brake is active,
      the system is configured to permit temporary overriding of the antilock braking for at least one wheel brake,
      actuation of a first of said at least one brake actuators produces a brake pressure controlled by an integral brake function of the integral brake system, and the temporary overriding of the antilock braking for at least one wheel brake is triggered by an application of a brake pressure by a second of said at least one brake actuators greater than the brake pressure introduced by the integral brake function.

2. An integral brake system having antilock braking for a motorcycle, comprising:

at least one brake actuating element;
a front wheel brake; and
a rear wheel brake,
wherein
the system is a motorcycle integral antilock braking system, and is configured to permit selective deactivation of the antilock braking for the front wheel brake while antilock braking for the rear wheel brake is active,
the system is configured to permit temporary overriding of the antilock braking for at least one wheel brake,
further comprising:
at least two brake actuating elements,
wherein
actuation of a first of the at least two brake actuating elements triggers an integral brake function of the integral brake system,
actuation of a second of the at least two brake actuating elements triggers a second brake function which is applied only the rear wheel brake, and
actuation of the second of the at least two brake actuating elements above a predetermined threshold temporarily overrides antilock braking for the rear wheel brake.

* * * * *